(12) United States Patent
Hewitt et al.

(10) Patent No.: US 10,919,661 B2
(45) Date of Patent: Feb. 16, 2021

(54) SYSTEM AND APPARATUS FOR A BEVERAGE CONTAINER

(71) Applicant: HEWY WINE CHILLERS, LLC, Orlando, FL (US)

(72) Inventors: Benjamin R. Hewitt, Orlando, FL (US); Stephen Bruner, Orlando, FL (US)

(73) Assignee: Corkcicle, LLC, Orlando, FL (US)

( * ) Notice: Subject to any disclaimer, the term of this patent is extended or adjusted under 35 U.S.C. 154(b) by 227 days.

(21) Appl. No.: 16/221,064

(22) Filed: Dec. 14, 2018

(65) Prior Publication Data

US 2019/0185196 A1    Jun. 20, 2019

Related U.S. Application Data

(60) Provisional application No. 62/599,349, filed on Dec. 15, 2017.

(51) Int. Cl.
| | |
|---|---|
| *A47G 19/22* | (2006.01) |
| *B65D 1/16* | (2006.01) |
| *B65D 1/02* | (2006.01) |
| *B65D 81/38* | (2006.01) |
| *A47J 41/00* | (2006.01) |

(52) U.S. Cl.
CPC ......... *B65D 1/165* (2013.01); *A47G 19/2272* (2013.01); *A47J 41/00* (2013.01); *B65D 1/0207* (2013.01); *B65D 81/3841* (2013.01)

(58) Field of Classification Search
CPC ............ B65D 81/3841; B65D 81/0207; B65D 81/165; B65D 81/3869; A47G 19/2272
USPC .......................................................... 220/669
See application file for complete search history.

(56) References Cited

U.S. PATENT DOCUMENTS

| | | | |
|---|---|---|---|
| 2,715,326 A | 8/1955 | Gits | |
| 3,871,543 A * | 3/1975 | Chadfield | B65D 11/16 215/12.1 |
| 6,243,936 B1 | 6/2001 | Biesecker et al. | |
| 7,669,725 B2 * | 3/2010 | Randolph | A61J 11/0065 215/12.1 |
| 8,561,825 B1 | 10/2013 | Kino et al. | |
| D756,716 S | 5/2016 | Hewitt et al. | |
| 9,681,771 B2 | 6/2017 | Herling et al. | |
| D799,274 S | 10/2017 | Hewitt et al. | |
| 2003/0029876 A1 | 2/2003 | Giraud | |

(Continued)

FOREIGN PATENT DOCUMENTS

CA            2766657 A1      7/2013

*Primary Examiner* — King M Chu
(74) *Attorney, Agent, or Firm* — Dickinson Wright, PLLC; Michael E. Noe, Jr.

(57) ABSTRACT

A beverage container may include a base having an axis, a closed bottom, an open top and an interior cavity therebetween. The base may be formed from a material that is opaque. In addition, a vessel is configured to contain a fluid. The vessel has an opening into or from which the fluid may flow relative to an interior of the vessel. The vessel is mounted in the interior cavity of the base and extends above and beyond the open top thereof. A radial air space is located between the vessel and the base relative to the axis. The vessel may be formed from a material that is at least one of translucent or transparent. In addition, a seal may be located between the base and the vessel. Each of the base, vessel and seal may be a different material.

20 Claims, 8 Drawing Sheets

(56) References Cited

U.S. PATENT DOCUMENTS

| | | | |
|---|---|---|---|
| 2008/0006643 A1* | 1/2008 | Ma | A47J 41/0011 220/592.16 |
| 2011/0062154 A1 | 3/2011 | Rhee | |
| 2016/0088960 A1 | 3/2016 | Liang | |
| 2017/0305641 A1 | 10/2017 | Bodum | |
| 2017/0355641 A1* | 12/2017 | Bost | C04B 28/025 |

* cited by examiner

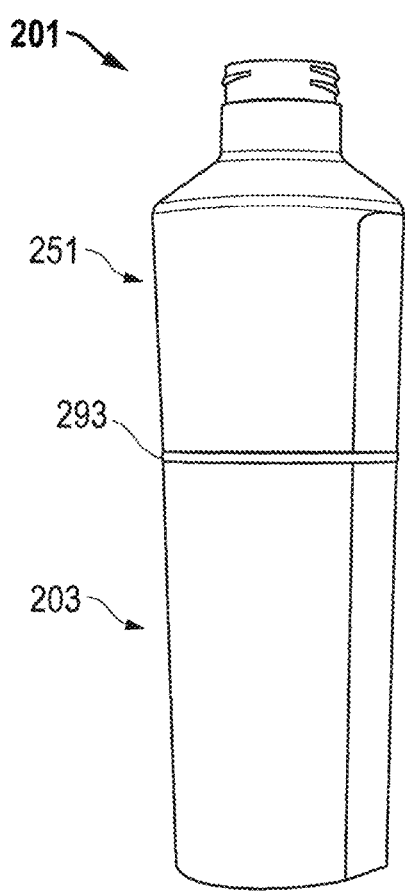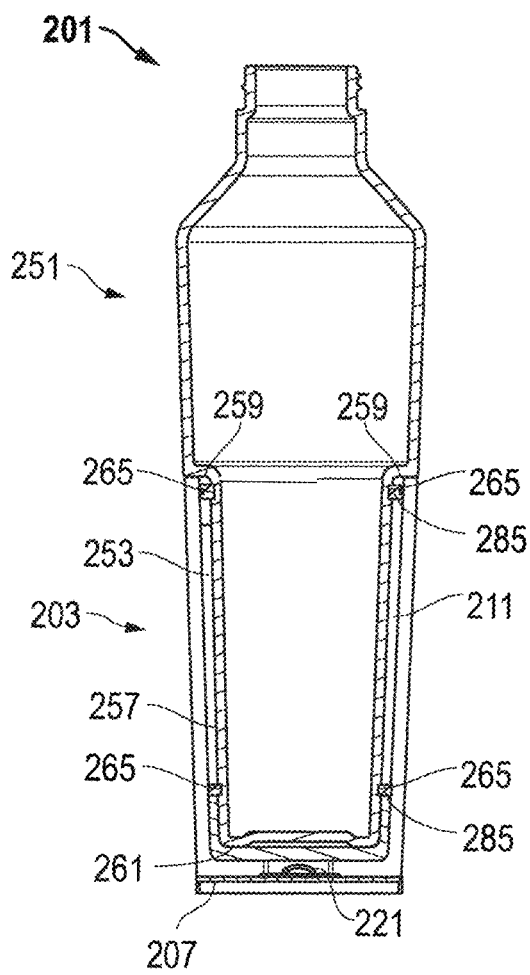
FIG. 8
FIG. 9

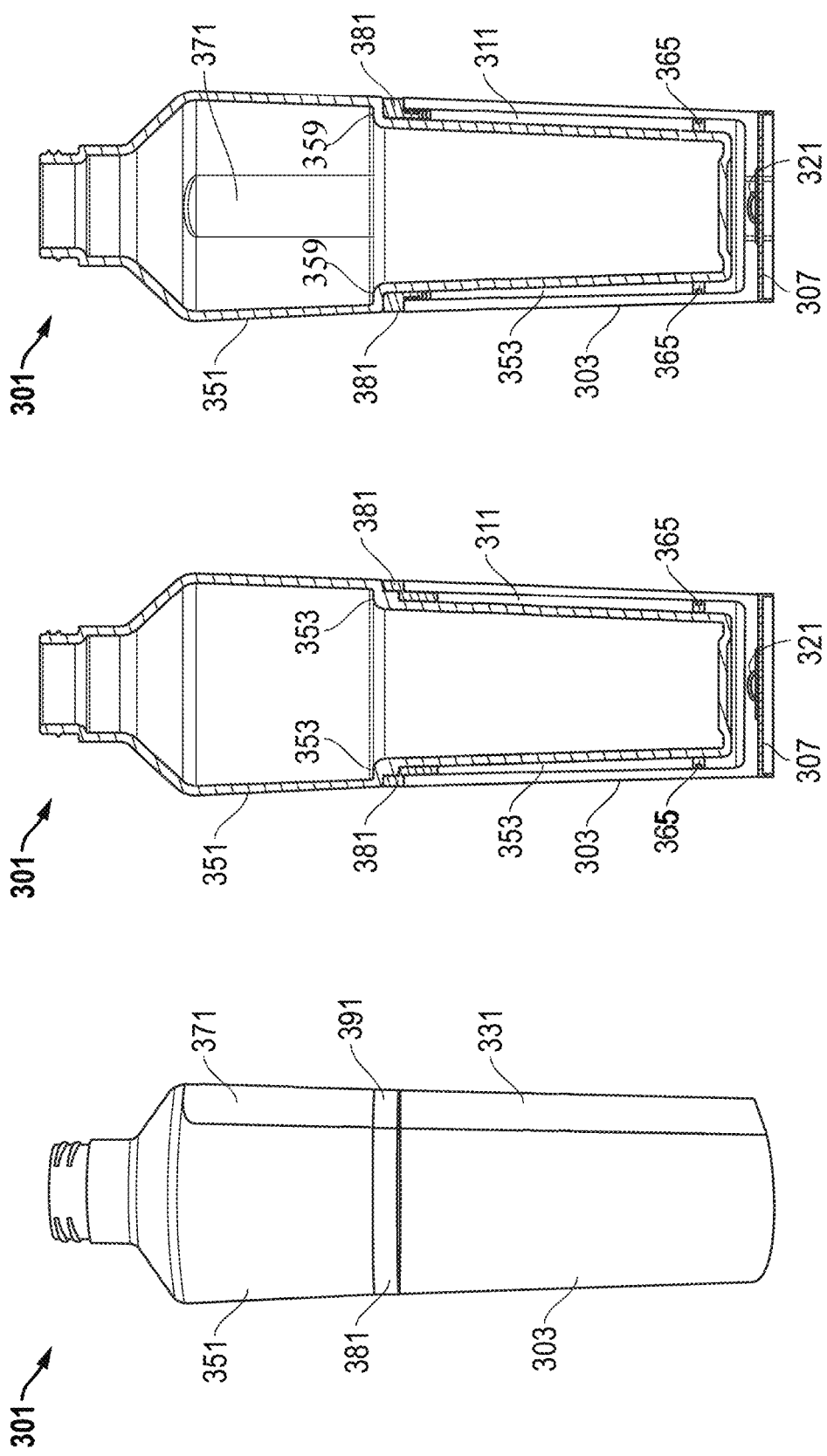

SYSTEM AND APPARATUS FOR A BEVERAGE CONTAINER

CROSS-REFERENCE TO RELATED APPLICATIONS

The present disclosure is related to and claims priority to U.S. Provisional Application No. 62/599,349 filed on Dec. 15, 2017, the entire disclosure of which is incorporated herein in reference in its entirety.

TECHNICAL FIELD

The present disclosure relates in general to containers and, in particular, to a system and apparatus for an insulated beverage container.

BACKGROUND

Conventional containers for insulating beverages are well known in the art. Some insulated beverage containers provide adequate insulation of a beverage, but no visibility of the contents of the container. Other insulated beverage containers permit visibility of the beverages that they contain, but they may underperform in insulating the beverage, providing grip for the user and/or other design limitations. Thus, improvements in beverage containers continue to be of interest.

SUMMARY

Embodiments of a system and apparatus for a beverage container are disclosed.

In one embodiment, the beverage container may include a base having an axis, a closed bottom, an open top and an interior cavity therebetween. The base may be formed from a material that is opaque. In addition, a vessel is configured to contain a fluid. The vessel has an opening into or from which the fluid may flow relative to an interior of the vessel. The vessel is mounted in the interior cavity of the base and extends above and beyond the open top thereof. A radial air space is located between the vessel and the base relative to the axis. The vessel may be formed from a material that is at least one of translucent or transparent. In addition, a seal may be located between the base and the vessel. Each of the base, vessel and seal may be formed from a different material.

In another embodiment, a beverage container may include a base, a vessel, a first seal, and a second seal. The base may include a cylindrical interior cavity, a closed portion, and an open portion. The vessel may include an upper portion, a lower portion configured to mount within the interior cavity, and a shoulder located between the upper portion and the lower portion. The first seal may circumscribe the vessel and be configured to separate the base and the shoulder. The second seal may be located between a top surface of the cylindrical interior cavity and the lower portion of the vessel.

The foregoing and other objects and advantages of these embodiments may be apparent to those of ordinary skill in the art in view of the following detailed description, taken in conjunction with the appended claims and the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts. So that the manner in which the features and advantages of the embodiments are attained and may be understood in more detail, a more particular description may be had by reference to the embodiments thereof that are illustrated in the appended drawings. However, the drawings illustrate only some embodiments and therefore are not to be considered limiting in scope as there may be other equally effective embodiments.

FIG. 8 illustrates an isometric view of another embodiment of a container for a beverage;

FIG. 9 illustrates a side sectional view of an embodiment of the container of FIG. 8;

FIG. 11 illustrates an isometric view of still another embodiment of a container for a beverage;

FIG. 12 illustrates a side sectional view of an embodiment of the container of FIG. 11;

FIG. 13 illustrates a front sectional view of an embodiment of the container of FIG. 11;

DETAILED DESCRIPTION

Figure 1:
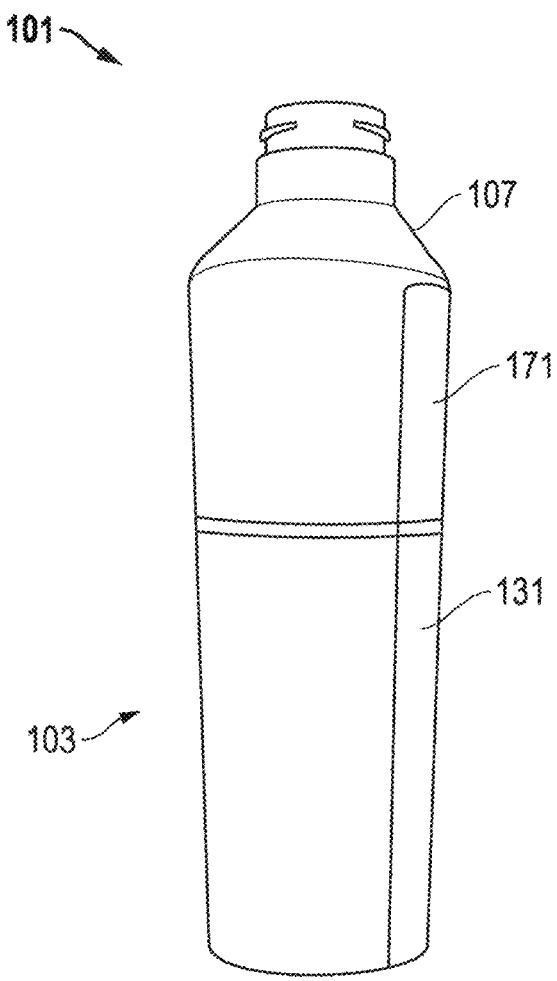
FIG. 1 illustrates an isometric view of an embodiment a container for a beverage.

FIGS. 1 through 15, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

Embodiments of a system and apparatus for a beverage container are disclosed.

FIGS. 1-7 illustrate a beverage container according to various embodiments of the present disclosure. The beverage container 101 illustrated in FIGS. 1-7 may include a base 103, a vessel 151, and a seal 181.

The beverage container 101 may include a base 103 having an axis 105, a closed bottom 107, an open top 109 and an interior cavity 111 therebetween. The base 103 may comprise a material that is opaque and may have no other openings other than open top 109. Various embodiments of the base 103 may comprise a metal selected from the group consisting of steel, aluminum, etc.

Various embodiments of the base 103 may include an outer wall 113 and an inner wall 115. The inner wall 115 may define the interior cavity 111. An insulation air space 117 may be located between the outer and inner walls 113, 115. In some versions, the insulation air space 117 may comprise a vacuum. The pressure inside the insulation air space 117 may be lower than the ambient, atmospheric pressure outside the beverage container 101. In these embodiments, In some embodiments, the radial thickness 119 of the insulation air space 117 may vary rotationally relative to the axis 105. For example, a grip radial thickness 119a, illustrated in FIG. 4, of the insulation air space 117 may be less than a body radial thickness 119b, illustrated in FIG. 3, of the insulation air space 117. Versions of the grip radial thicknesses 119a may be located adjacent to the substantially vertical flat surfaces 131, illustrated in FIG. 1, of the base 103.

Various embodiments of the beverage container 101 may include a vessel 151, for example an insert, configured to contain a fluid. The vessel 151 may include an opening 152 through which the fluid may flow to an interior of the vessel 151. The opening 152 of the vessel 151 may be unobstructed. For example, the opening 452 of the vessel 451 illustrated in FIGS. 14 and 15 does not contain a lid or closure mechanism for the beverage container 401.

In some embodiments, the beverage container 101 may include a lid 163 for the opening 152 in the vessel 151. The lid 163 may be attachable to the vessel 151 to render the beverage container 101 in a fluid-closed configuration. In addition, the lid 163 may be removed from the vessel 151 to render the beverage container 101 in a fluid-open configuration.

In some embodiments, the vessel 151 may be mounted in the interior cavity of the base 103 and extend above and beyond the open top 109 thereof. In some embodiments, a radial air space 153 may be located between the vessel 151 and the base 103 relative to the axis 105. The vessel 151 may be formed from a material that is at least one of translucent or transparent. For example, a material used to form the vessel 151 may include at least one of glass or a polymer.

Figures 3, 4:
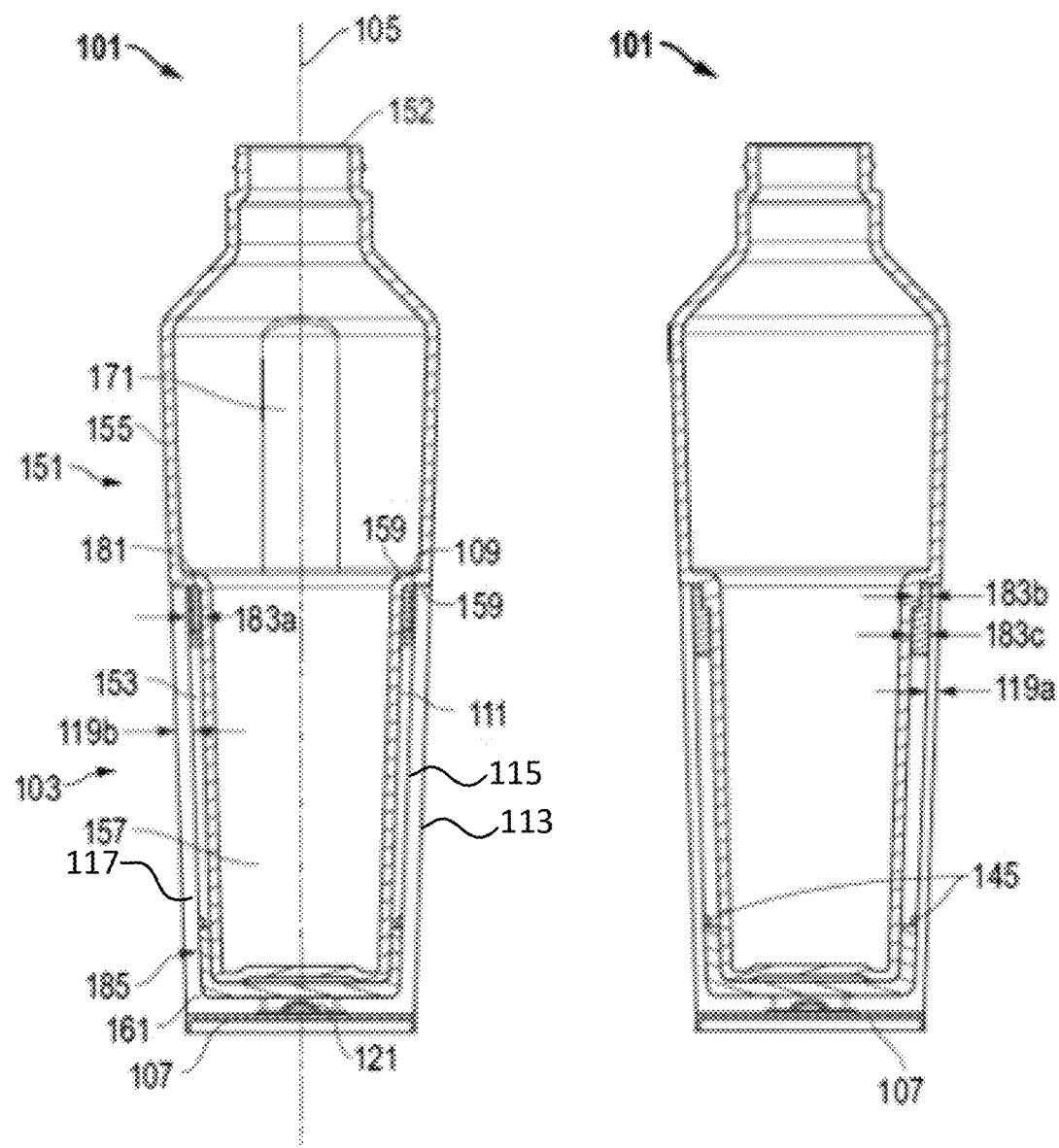
FIG. 3 illustrates a front sectional view of an embodiment of the container of FIG. 1.
FIG. 4 illustrates a side sectional view of an embodiment of the container of FIG. 1.
Figure 5:
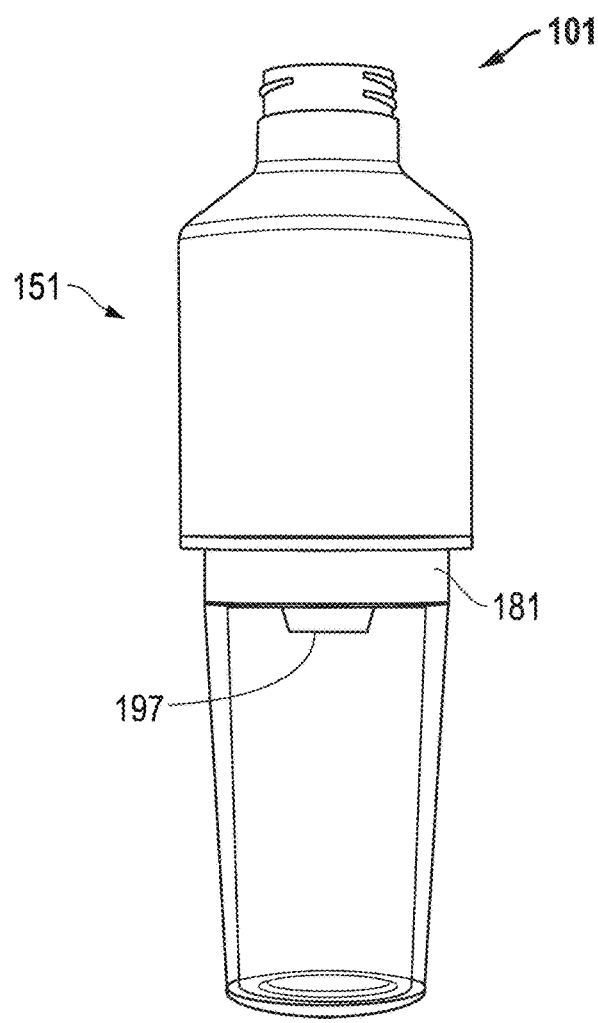
FIG. 5 illustrates an isometric view of an embodiment of portions of the container of FIG. 1.

As illustrated in FIGS. 1, 3 and 4, in some embodiments the vessel 151 directly contacts only one surface of the base 103 (e.g., adjacent to the open top 109, as shown). For example, the vessel 151 may include an upper portion 155 that comprises an upper shape that tapers in an axial direction. The vessel 151 may include a lower portion 157 that comprises a lower shape that tapers in an axial direction. The vessel 151 may include a shoulder 159 that is substantially perpendicular to the axis 105 and may be located between the upper and lower portions 155, 157. In some embodiments, the shoulder 159 may axially coincide with the open top 109 of the base 103. In some embodiments, the shoulder 159 may be the only portion of the vessel 151 that directly contacts the base 103. In some embodiments, an axial bottom 161 of the vessel 151 may be free of direct contact with an axial upper surface 121 of the closed bottom 107 of the base 103. In some embodiments, an axial air space 123 may be located between the axial bottom 161 of the vessel 151 and the base 103.

Embodiments of the beverage container 101 may further include a seal 181. The seal 181 may be located between the base 103 and the vessel 151. In some embodiments, each of the base 103, vessel 151 and seal 181 may be formed different materials. In some embodiments, the seal 181 may include at least one of an elastomer or silicone. In some embodiments, at a least a portion of the seal 181 may be located between the axial bottom 161 of the vessel 151 and the base 103. In some embodiments, an outer surface of the vessel 151 may include at least one radial outer groove 165 that circumscribes the vessel 151 relative to the axis 105. In this embodiment, the seal 181 may seat in the radial outer groove 165.

In some embodiments, the seal 181 does not fill a space between the base 103 and vessel 151. In one embodiment, the seal 181 may be not directly visible from an exterior of the beverage container 101. In some embodiments, the seal 181 may be indirectly visible through the vessel 151 as a refraction. In other embodiments, for example as illustrated in FIGS. 11-13, a seal 381 may be directly visible from an exterior of the beverage container 301. In some embodiments, the seal 381 may be similar to the seal 181 illustrated in FIGS. 1-7. The seal 381 may provide a friction surface for the beverage container 301 that has higher friction than any other portion of the beverage container 301.

In some embodiments, the seal 181 may include a radial thickness 183 (see radial thicknesses 183b and 183c in FIG. 4) that varies relative to the axis 105. In one embodiment, the seal 181 may include a radial thickness 183a, for example as illustrated in FIG. 3, that varies circumferentially (compare radial thicknesses 183b and 183c in FIG. 4) relative to the axis 105. In some embodiments, the radial thicknesses 183a, 183b and 183c of the first seal 181 may vary relative to the axis 105.

In some embodiments, the beverage container 101 may include a plurality of seals 181, 185. Seals 181, 185 may be axially spaced apart from each other, as shown. Each seal 181, 185 may circumscribe the vessel 151 relative to the axis 105. For example, the first seal 181 may be located adjacent to the open top 109 of the base 103, and the second seal 185 may be located in the interior cavity 111 of the base 103 adjacent to the closed bottom 107 of the base 103.

In some embodiments, one or both of the seals 181, 185 may comprise an elastomer or silicone. As a result of this composition, one or both of the seals 181, 185 may function as a shock absorber between the base 103 and the vessel 151. In some embodiments, one or both of the seals 181, 185 may function to reduce a rattling sound produced by the base 103 and the vessel 151 coming into contact with each other when the beverage container 101 is being transported.

In some embodiments, the seal 181 may function as an alignment guide. For example, the seal 181 may include a distinctive mark to allow the seal 181 to assist a user in correctly aligning the vessel 151 to the base 103.

In some embodiments, the base 103 may comprise metal, the vessel 151 may comprise glass and the seal 181 (e.g., and seal 185) may comprise elastomer. At least one of the base 103, vessel 151 or seal 181 may be axially symmetric and comprise at least one grip. For example, the base 103 may include the substantially vertical flat surfaces 131 as a grip, the vessel 151 may include the substantially vertical flat surfaces 171 as a grip, and the seal 381 may include a substantially vertical flat surface 391 as a grip. For example, the seal 381 may be illustrated in FIG. 11. The one or more grips may cause the beverage container not to be uniform with a respective outer shape thereof. For example, the beverage container 201 may include a curved portion of the body and a flat grip. In some embodiments, as illustrated in FIG. 3, the grips 171 of vessel 151 may be located only on the upper portion 155 and are not necessarily on the lower portion 157.

Embodiments of the base 103 and the vessel 151 may be axially symmetric and comprise a grip that is not uniform with a respective outer shape thereof. The grips of the base 103 and vessel 151 may be rotationally aligned with respect to the axis 105, and the outer shapes of the base 103 and vessel 151 may be complementary to each other. In other versions, for example as illustrated in FIG. 11, each of the base 303, vessel 351 and seal 381 may be axially symmetric and comprise a grip 331, 371, 391, respectively, that is not uniform with a respective outer shape thereof. The grips 331, 371, 391 of the base 303, vessel 351 and seal 381, respectively, may be rotationally aligned with respect to the axis 304, and the outer shapes of the base 303, vessel 351 and seal 381 may be complementary to each other. The term complementary refers to the shapes of the base 303, vessel 351 and seal 381 and the arrangement in which the shapes of the base 303, vessel 351 and seal 381 align and create an aesthetically pleasing appearance.

Figure 2:
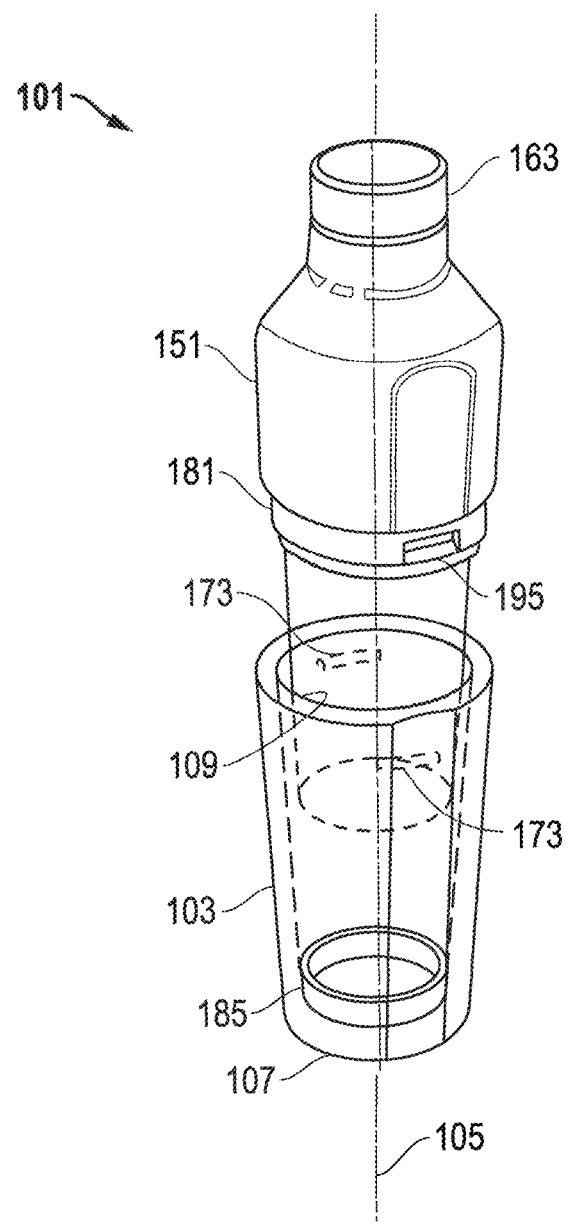
FIG. 2 illustrates an exploded isometric view of an embodiment of the container of FIG. 1.

As illustrated in FIG. 2, the base 103 may include at least one protrusion. For example, the base 103 may include the horizontal ribs 173 near the open top 109. In some embodiments, the ribs 173 may extend from the inner surface of base 103 into the interior cavity 111 radially inward toward the axis 105. In some embodiments, the seal 181 may include at least one notch 195 that is complementary in an outer surface thereof that receives the protrusion.

In other embodiments, as illustrated in FIGS. 3 and 4, bumps 145 may function as the protrusion and extend from the inner surface into the interior cavity radially inward toward the axis 105. The bumps 145 may be located adjacent to the bottom 107 of base 103. The seal 185 may seat axially beneath the protrusion, for example the bumps 145, to secure the seal 185 in the interior cavity 111 of the base 103.

Figure 6:
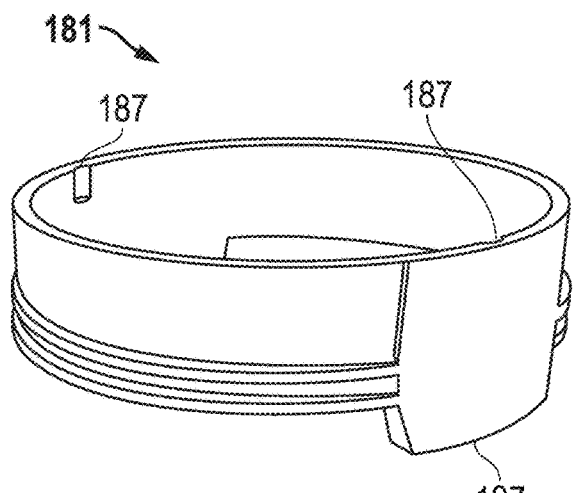
FIG. 6 illustrates an isometric view of an embodiment of a seal of the container of FIG. 1.

As illustrated in FIG. 6, the seal 181 may include at least one aperture 187 that extends axially and is configured to facilitate air passage when the vessel 151 is installed in or removed from the base 103. For example, FIG. 6 illustrates two apertures 187. The radial air space 153 between the vessel 151 and the base 103 may be located axially below the seal 181.

Figure 7:
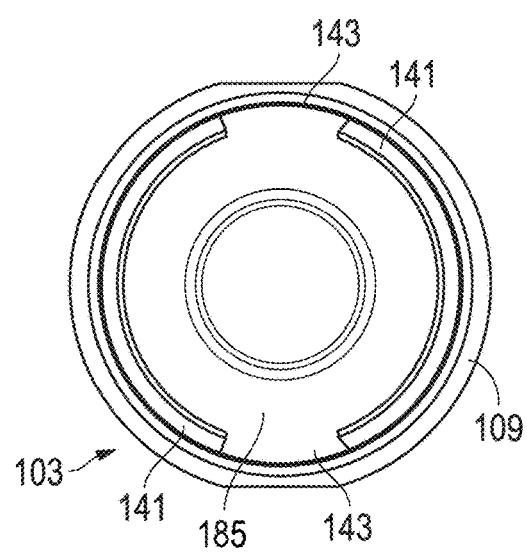
FIG. 7 illustrates a top view of an embodiment of other portions of the container of FIG. 1.

In some embodiments, as illustrated in FIGS. 6 and 7, the seal 181 may include ribs 197 that extend axially. The base 103 may include horizontal ledges 141, as illustrated in FIG. 7, that have notches 143 into which ribs 197 on seal 181 may seat to properly rotationally orient vessel 151 with respect to base 103.

Figure 10:
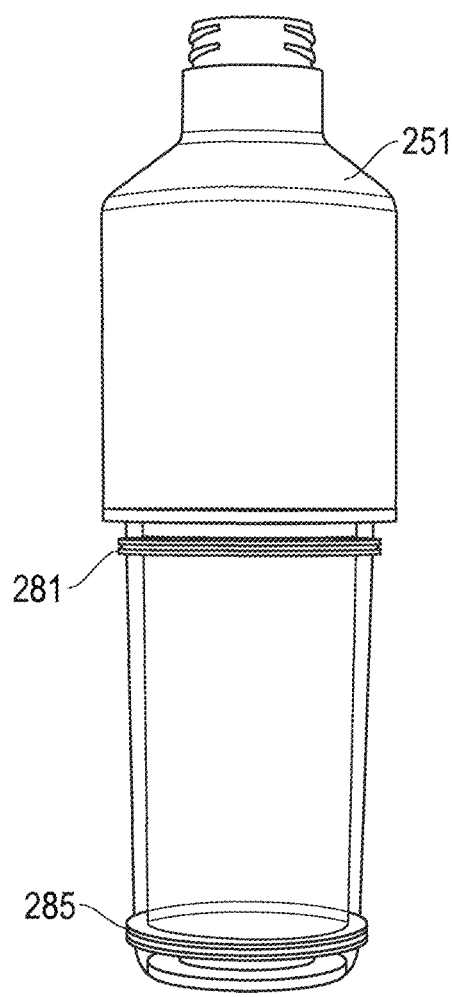
FIG. 10 illustrates an isometric view of an embodiment of portions of the container of FIG. 8.

FIGS. 8-10 illustrate a beverage container according to various embodiments of the present disclosure. The beverage container 201 illustrated in FIGS. 8-10 may include a base 203, a vessel 251, a first seal 281, and a second seal 285.

As illustrated in FIGS. 8-10, both the first and second seals 281, 285 may comprise wiper seals that seal radially between the base 203 and vessel 251. The first seal 281 may be located between only radial surfaces of the base 203 and vessel 251.

In some embodiments, one or both of the seals 281, 285 may comprise an elastomer or silicone. As a result of this composition, one or both of the seals 281, 285 may function as a shock absorber between the base 203 and the vessel 251. In some embodiments, one or both of the seals 281, 285 may function to reduce a rattling sound produced by the base 203 and the vessel 251 coming into contact with each other when the beverage container 101 is being transported.

In some embodiments, the seal 281 may function as an alignment guide. For example, the seal 281 may include a distinctive mark to allow the seal 281 to assist a user in correctly aligning the vessel 251 to the base 203.

In some embodiments, the beverage container 201 may further include a ring 293 mounted to the vessel 251 between the vessel 251 and the base 203 to prevent contact between the vessel 251 and the base 203. The ring 293 may be mounted to the vessel 251 between the vessel 251 and the base 203. Various embodiments of the ring 293 may circumscribe the vessel 251 and be directly visible from an exterior of the beverage container 201. In some embodiments, the ring 293 may comprise an opaque polymer that is a different color from or the same color as at least one of the base 203 or vessel 251.

In some embodiments, the vessel 251 may include a shoulder 259. In some embodiments, the shoulder 259 may be the only portion of the vessel 251 that directly contacts the base 203. In some embodiments, a radial air space 253 may be located between the vessel 251 and the base 203.

In some embodiments, an outer surface of the vessel 251 may include at least one radial outer groove 265 that circumscribes the vessel 251. A seal 281 may seat in the radial outer groove 265.

In some embodiments, the base 203 may include an interior cavity 211. In some embodiments, the vessel 251 may seat within the interior cavity 211. The interior cavity 211 may be defined by an inner wall of the base 203.

In some embodiments, when the vessel 251 is seated within the interior cavity 211, an axial bottom 261 of the vessel 251 may be free of direct contact with an axial upper surface 221 of the closed bottom 207 of the base 203. In some embodiments, an axial air space may be located between the axial bottom 261 of the vessel 251 and the base 203.

FIGS. 11-13 illustrate a beverage container according to various embodiments of the present disclosure. The beverage container 301 illustrated in FIGS. 11-13 may include a base 303, a vessel 351, and a seal 381.

As illustrated in FIGS. 11-13, the seal 381 may be located between both axial and radial surfaces of the base 303 and vessel 351 relative to the axis 305. Although not illustrated, a second seal may be located between only radial surfaces of the base 303 and vessel 351 relative to the axis 305.

In some embodiments, the vessel 351 may include a shoulder 359. In some embodiments, the shoulder 359 may be the only portion of the vessel 351 that directly contacts the base 303. In some embodiments, a radial air space 353 may be located between the vessel 351 and the base 303.

In some embodiments, an outer surface of the vessel 351 may include at least one radial outer groove 365 that circumscribes the vessel 351. A seal 381 may seat in the radial outer groove 365.

In some embodiments, the base 303 may include an interior cavity 311. In some embodiments, the vessel 351 may seat within the interior cavity 311. The interior cavity 311 may be defined by an inner wall of the base 303.

In some embodiments, an axial bottom 321 of the vessel 351 may be free of direct contact with an axial upper surface of the closed bottom 307 of the base 303. In some embodiments, an axial air space may be located between the axial bottom 321 of the vessel 351 and the base 303.

Figure 14:
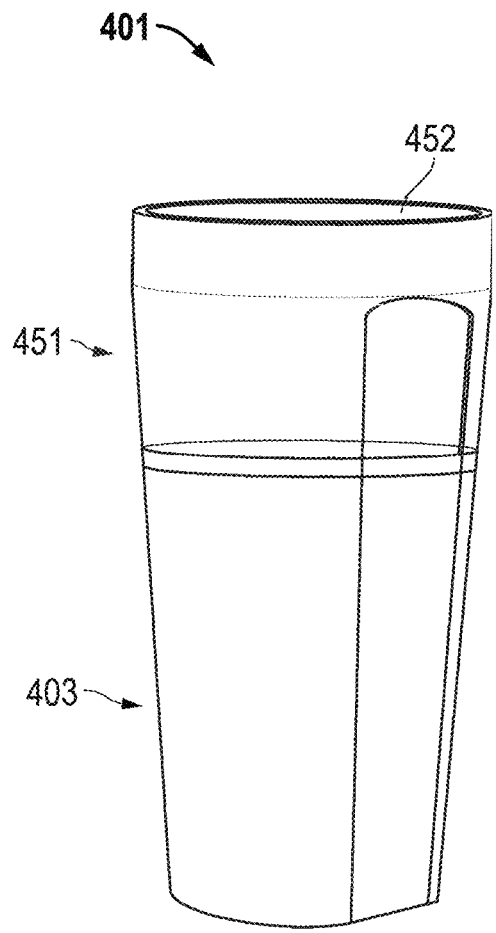
FIG. 14 illustrates an isometric view of yet another embodiment of a container for a beverage.
Figure 15:
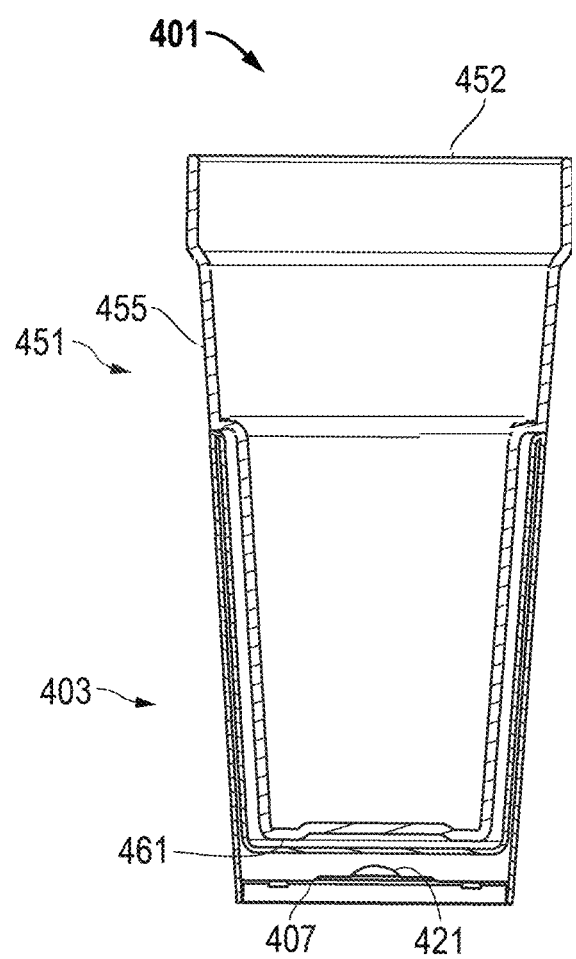
FIG. 15 illustrates a side sectional view of an embodiment of the container of FIG. 14.

FIGS. 14-15 illustrate a beverage container according to various embodiments of the present disclosure. The beverage container 401 illustrated in FIGS. 14-15 may include a base 403, a vessel 451, and an opening 452.

In some embodiments, the base 403 may be similar to the base 103, base 203, and base 303. The base 403 may be configured to allow the vessel 451 to seat within an interior cavity of the base 403. In some embodiments, an axial bottom 461 of the vessel 451 may be free of direct contact with an axial upper surface of the closed bottom 407 of the base 403. In some embodiments, an axial air space may be located between the axial bottom 461 of the vessel 451 and the base 403.

The vessel 451 may include an opening 452 through which the fluid may flow to an interior of the vessel 451. The opening 452 of the vessel 451 may be unobstructed. For example, the opening 452 of the vessel 451 illustrated in FIGS. 14 and 15 does not contain a lid or closure mechanism for the beverage container 401.

The vessel 451 may include an upper portion 455 that comprises an upper shape that tapers in an axial direction. The vessel 151 may also include a lower portion that comprises a lower shape that tapers in an axial direction.

Some embodiments of the beverage container may not include threads or other mechanical interlocking fasteners for assembling the apparatus. For example, some embodiments of the beverage container may be assembled by an axial sliding motion and friction or interference fit, such as via the one or more seals. In some embodiments, the beverage container 201 may include threads to attach the lid to the top of the vessel but no other threads or other mechanical interlocking fasteners. Other embodiments of the beverage container may include only the base, the vessel, the lid, and the at least one seal.

Other versions may include one or more of various other embodiments. For example, the beverage container may comprise a base having an axis, a closed bottom, an open top and an interior cavity therebetween. The base may comprise a material that is opaque. The beverage container may further comprise a vessel configured to contain a fluid. The vessel may include an opening into or from which the fluid may flow relative to an interior of the vessel. The vessel may be mounted in the interior cavity of the base and extend above and beyond the open top thereof. The vessel may include radial air space located between the vessel and the base relative to the axis. The vessel may further comprise a material that is at least one of translucent or transparent.

The vessel may further comprise a seal located between the base and the vessel. The seal may comprise a plurality of seals that are axially spaced apart from each other. Each of the plurality of seals may circumscribe the vessel relative to the axis. Each of the base, vessel and seal may comprise a different material.

In some embodiments, the base comprises an outer wall and an inner wall. The inner wall may define the interior cavity. An insulation air space may be located between the outer and inner walls.

In some embodiments, the insulation air space comprises a vacuum such that a pressure inside the insulation air space is lower than the ambient, atmospheric pressure outside of the beverage container.

In some embodiments, a radial thickness of the insulation air space may vary rotationally relative to the axis.

In some embodiments, a grip radial thickness of the insulation air space is less than a body radial thickness of the insulation air space.

In some embodiments, the vessel may directly contact only one surface of the base.

In some embodiments, an upper portion of the vessel may comprise an upper shape that tapers in an axial direction, a lower portion of the vessel may comprise a lower shape that tapers in an axial direction, and a shoulder may be located between the upper and lower shapes that is substantially perpendicular to the axis.

In some embodiments, the shoulder axially coincides with the open top of the base. The shoulder may be the only portion of the vessel that directly contacts the base.

In some embodiments, an axial bottom of the vessel is free of direct contact with an axial upper surface of the closed bottom of the base.

In some embodiments, there may be an axial air space located between the axial bottom of the vessel and the base.

In some embodiments, at a least a portion of the seal is located between the axial bottom of the vessel and the base.

In some embodiments, the opening of the vessel is unobstructed.

In some embodiments, the beverage container 201 may further comprise a lid for the opening in the vessel. The lid may be attachable to the vessel to render the beverage container in a fluid-closed configuration. The lid may be removable from the vessel to render the beverage container in a fluid-open configuration.

In some embodiments, the vessel may comprise at least one of glass or a polymer.

In some embodiments, an outer surface of the vessel may comprise a radial outer groove that circumscribes the vessel relative to the axis. The seal is configured to seat in the radial outer groove.

In some embodiments, the seal does not fill a space between the base and vessel. The seal may not be directly visible from an exterior of the beverage container.

In some embodiments, the seal is indirectly visible through the vessel as a refraction.

In some embodiments, the seal is directly visible from an exterior of the beverage container. The seal may provide a friction surface for the beverage container that has higher friction than any other portion of the beverage container.

In some embodiments, the seal may comprise a radial thickness that varies relative to the axis.

In some embodiments, the seal may comprise a radial thickness that varies circumferentially relative to the axis.

In some embodiments, a first seal may be located adjacent to the open top of the base and a second seal may be located in the interior cavity of the base adjacent to the closed bottom of the base.

In some embodiments, both the first and second seals comprise wiper seals that only seal radially between the base and vessel with respect to the axis.

In some embodiments, the first seal may be located between only radial surfaces of the base and vessel relative to the axis. In other embodiments, the first seal may be located between both axial and radial surfaces of the base and vessel relative to the axis.

In some embodiments, the second seal may be located between only radial surfaces of the base and vessel relative to the axis. In other embodiments, the second seal may be located between both axial and radial surfaces of the base and vessel relative to the axis.

In some embodiments, a radial thickness of the first seal varies relative to the axis.

In some embodiments, the second seal may be located between both axial and radial surfaces of the base and vessel relative to the axis.

In some embodiments, the second seal may comprise a cup.

In some embodiments, the seal may comprise an aperture that extends axially and is configured to facilitate air passage when the vessel is installed in or removed from the base.

In some embodiments, the radial air space between the vessel and the base is located axially below the seal.

In some embodiments, the base may comprise a metal. In some embodiments, the vessel may comprise glass. In some embodiments, the seal may comprise elastomer.

In some embodiments, at least one of the base, vessel or seal is axially symmetric and comprises a grip that is not uniform with a respective outer shape thereof. In other embodiments, each of the base and the vessel is axially symmetric and comprises a grip that is not uniform with a respective outer shape thereof. The grips of the base and vessel may be rotationally aligned with respect to the axis. The outer shapes of the base and vessel may be complementary to each other.

In other embodiments, each of the base, vessel and seal may be axially symmetric and comprise a grip that is not uniform with a respective outer shape thereof. In these embodiments, the grips of the base, vessel and seal may be rotationally aligned with respect to the axis and the outer shapes of the base, vessel and seal may be complementary to each other.

In some embodiments, the beverage container 201 may further comprise a ring mounted to the vessel between the vessel and the base to prevent contact between the vessel and the base. In some embodiments, the ring may circumscribe the vessel and be visible from an exterior of the beverage container. The ring may comprise an opaque polymer that differs in color from the base and vessel.

In some embodiments, the base may comprise a protrusion that extends from the interior cavity radially inward toward the axis. The seal may comprise a notch in an outer surface thereof that receives the protrusion.

In some embodiments, the base may comprise a protrusion that extends from the interior cavity radially inward toward the axis. The seal may seat axially beneath the protrusion to secure the seal in the interior cavity of the base.

In some embodiments, the beverage container may comprise a base, a vessel, a first seal, and a second seal. The base may comprise a cylindrical interior cavity, a closed portion, and an open portion. In some embodiments, the closed portion may be a bottom of the beverage container and the open portion may be the opening to the cylindrical interior cavity.

The vessel may include an upper portion, a lower portion, and a shoulder located between the upper portion and the lower portion. The lower portion may be configured to mount within the interior cavity of the base. The shoulder may be located between the upper portion and the lower portion.

The first seal may circumscribe the vessel and separate the base and the shoulder. For example, the first seal may be in the shape of a ring and coupled to a top portion of the interior cavity of the base. In another example, the first seal may be a plurality of seals spaced along the top portion of the interior cavity of the base.

The second seal may be located between a top surface of the cylindrical interior cavity and the lower portion of the vessel. For example, when the lower portion of the vessel is mounted within the interior cavity, the second seal may serve as a boundary between the lower portion of the vessel and the base. In some embodiments, the second seal may serve as a shock absorber to protect one or more of the vessel or base from breakage.

In some embodiments, the interior cavity may include an inner wall, an outer wall, and an insulation air space between the inner wall and the outer wall. The air pressure of the insulation air space may be lower than the air pressure of the ambient atmospheric pressure outside the beverage container. Maintaining the lower air pressure within the insulation air space may allow the beverage container to maintain the contents within the vessel at an optimal temperature for an extended period of time. For example, maintaining the lower air pressure within the insulation air space may allow cold contents to remain cold longer than they would in another beverage container or may allow hot contents to remain hot longer than they would in another beverage container.

In some embodiments, the upper portion of the vessel may comprise a diameter greater than a diameter of the lower portion of the vessel. The diameter of the upper portion of the vessel may be approximately the same as a diameter of the base. For example, if the upper portion of the vessel has a diameter approximately the same as the diameter of the base, when the lower portion of the vessel is mounted within the interior cavity of the base, the beverage container may have a uniform, aesthetically pleasing appearance.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of invention.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans may appreciate that certain features are, for clarity, described herein in the context of separate embodiments, may also be provided in combination in a single embodiment. Conversely, various features that are described in the context of a single embodiment may also be provided separately or in any subcombination. Further, references to values stated in ranges include each and every value within that range.

What is claimed is:

1. A beverage container, comprising:
   a base including an axis, a closed bottom, an open top, and an interior cavity, wherein the base comprises an opaque material;
   a vessel configured to contain a fluid, comprising a material that is translucent or transparent, an opening to allow the fluid to flow to an interior of the vessel, wherein when the vessel is mounted in the interior cavity of the base, a portion of the vessel extends above the open top of the base, and a radial air space is present between an exterior of the vessel and an interior of the base relative to the axis; and
   a seal between the base and the vessel when the vessel is mounted in the interior cavity of the base, the seal comprising a plurality of seals axially spaced apart from each other, each seal of the plurality of seals circumscribing the vessel relative to the axis, and wherein each of the base, vessel and seal comprise a different material; and
   the seal is visible from an exterior of the beverage container and comprises a friction surface that includes higher friction than any other surface of the beverage container.

2. The beverage container of claim 1, wherein:
   the base comprises an outer wall and an inner wall;
   the inner wall defines the interior cavity;
   an insulation air space is located between the outer and inner walls and comprises a vacuum to maintain a pressure inside the insulation air space that is lower than an ambient, atmospheric pressure outside the beverage container;
   a radial thickness of the insulation air space varies rotationally relative to the axis; and
   a grip radial thickness of the insulation air space is less than a body radial thickness of the insulation air space.

3. The beverage container of claim 1, wherein:
   the vessel directly contacts only one surface of the base; and
   the opening of the vessel is unobstructed.

4. The beverage container of claim 1, wherein the vessel comprises:
   an upper portion including an upper shape that tapers in an axial direction;
   a lower portion including a lower shape that tapers in an axial direction; and
   a shoulder substantially perpendicular to the axis and located between the upper and lower portions, wherein the shoulder axially coincides with the open top of the base and is the only portion of the vessel that directly contacts the base.

5. The beverage container of claim 1, wherein:
   an axial bottom of the vessel does not directly contact an axial upper surface of the closed bottom of the base;
   an axial air space is located between the axial bottom of the vessel and the base; and
   at least a portion of the seal is located between the axial bottom of the vessel and the base.

6. The beverage container of claim 1, further comprising a lid configured to attach to the vessel, wherein the beverage container is in a fluid-closed configuration when the lid is attached to the vessel and the beverage container is in a fluid-open configuration when the lid is not attached to the vessel.

7. The beverage container of claim 1, wherein:
   the vessel comprises at least one of glass or a polymer;
   an outer surface of the vessel comprises a radial outer groove that circumscribes the vessel relative to the axis; and
   the seal seats in the radial outer groove.

8. The beverage container of claim 1, wherein:
   the seal comprises a radial thickness that varies relative to the axis; and
   the radial thickness varies circumferentially relative to the axis.

9. The beverage container of claim 1, wherein:
   the plurality of seals comprises a first seal located adjacent to the open top of the base and a second seal located in the interior cavity of the base adjacent to the closed bottom of the base; and
   the beverage container comprises at least one of the following:
      both the first and second seals comprise wiper seals that seal radially between the base and vessel with respect to the axis;
      the first seal is located between only radial surfaces of the base and vessel relative to the axis;
      the first seal is located between both axial and radial surfaces of the base and vessel relative to the axis;
      the second seal is located between only radial surfaces of the base and vessel relative to the axis;

the second seal is located between both axial and radial surfaces of the base and vessel relative to the axis;
a radial thickness of the first seal varies relative to the axis; or
the second seal is located between both axial and radial surfaces of the base and vessel relative to the axis, and the second seal comprises a cup.

10. The beverage container of claim 1, wherein the seal comprises an aperture extending axially to facilitate air passage.

11. The beverage container of claim 1, wherein:
the radial air space between the vessel and the base is located axially below the seal;
the base comprises metal;
the vessel comprises glass; and
the seal comprises elastomer or silicone.

12. The beverage container of claim 1, wherein at least one of the base, vessel or seal is axially symmetric and comprises a grip that is not uniform with a respective outer shape thereof.

13. The beverage container of claim 1, wherein:
both the base and the vessel are axially symmetric and comprise a grip that is not uniform with a respective outer shape thereof;
the grips of the base and vessel are rotationally aligned with respect to the axis; and
the outer shapes of the base and vessel are complementary to each other.

14. The beverage container of claim 1, wherein:
each of the base, vessel and seal is axially symmetric and comprises a grip that is not uniform with a respective outer shape thereof; and
the grips of the base, vessel and seal are rotationally aligned with respect to the axis; and
the outer shapes of the base, vessel and seal are complementary to each other.

15. The beverage container of claim 1, further comprising a ring mounted to the vessel between the vessel and the base to prevent contact between the vessel and the base, wherein the ring circumscribes the vessel, is visible on an exterior of the beverage container, and comprises an opaque polymer that differs in color from the base and vessel.

16. The beverage container of claim 1, wherein:
the base comprises a protrusion extending from the interior cavity radially inward toward the axis;
an outer surface of the seal comprises a notch to receive the protrusion; and
the seal seats axially beneath the protrusion to secure the seal in the interior cavity of the base.

17. A beverage container, comprising:
a base comprising an interior cavity, a closed bottom, and an open top, the interior cavity comprises an inner wall, an outer wall, and an insulation air space between the inner wall and outer wall, and an air pressure of the insulation air space is lower than an ambient atmospheric pressure outside the beverage container;
a vessel comprising an upper portion, a lower portion configured to be mounted in the interior cavity, and a shoulder located between the upper portion and the lower portion;
a first seal circumscribing the vessel below the upper portion; and
a second seal present between the interior cavity of the base and the lower portion of the vessel when the lower portion of the vessel is mounted in the inner cavity.

18. The beverage container of claim 17, wherein:
a diameter of the upper portion of the vessel is greater than a diameter of the lower portion of the vessel; and
the diameter of the upper portion of the vessel is approximately the same as a diameter of the base.

19. A beverage container, comprising:
a base including an axis, a closed bottom, an open top, and an interior cavity, wherein the base comprises an opaque material;
a vessel configured to contain a fluid, the vessel comprises a material that is translucent or transparent, an opening to allow the fluid to flow to an interior of the vessel, wherein when the vessel is mounted in the interior cavity of the base, a portion of the vessel extends above the open top of the base, and a radial air space is present between an exterior of the vessel and an interior of the base relative to the axis;
a seal between the base and the vessel when the vessel is mounted in the interior cavity of the base, the seal comprises a plurality of seals axially spaced apart from each other, each seal of the plurality of seals circumscribes the vessel relative to the axis, and wherein each of the base, vessel and seal comprise a different material; and
at least one of the base, vessel or seal is axially symmetric and comprises a grip that is not uniform with a respective outer shape thereof.

20. The beverage container of claim 19, wherein the vessel comprises:
an upper portion including an upper shape that tapers in an axial direction;
a lower portion including a lower shape that tapers in an axial direction; and
a shoulder substantially perpendicular to the axis and located between the upper and lower portions, wherein the shoulder axially coincides with the open top of the base and is the only portion of the vessel that directly contacts the base.

* * * * *